United States Patent Office 3,500,926
Patented Mar. 17, 1970

3,500,926
ELECTROLESS METAL BONDING OF UNCONSOLIDATED FORMATIONS INTO CONSOLIDATED FORMATIONS
Edwin A. Richardson, Houston, Tex., assignor to Shell Oil Company, New York, N.Y., a corporation of Delaware
No Drawing. Continuation-in-part of application Ser. No. 579,223, Sept. 14, 1966. This application Dec. 22, 1967, Ser. No. 692,726
Int. Cl. E21b 33/138
U.S. Cl. 166—292          18 Claims

ABSTRACT OF THE DISCLOSURE

A method of consolidating an incompetent formation by metalizing or metal plating the formation by an electroless metal plating process using a metal plating solution and a deactivation solution capable of controlling metal deposition rate.

CROSS-REFERENCES TO RELATED APPLICATION

This application is a continuation-in-part of copending patent application Ser. No. 579,223, filed Sept. 14, 1966 and matured as U.S. Patent 3,393,737 on July 23, 1968.

This invention relates to treating incompetent or unconsolidated formations such as unconsolidated subsurface formations and more particularly to treatment of loose or incompetent earth formation surrounding well bores so as to consolidate said formations into a permeable, thermally and hydrolytically resistant consolidated formation for improved and efficient recovery of fluids therefrom.

BACKGROUND OF THE INVENTION

It is well known that many difficulties are encountered in producing or recovering fluids from incompetent earth formations due to collapsing or sloughing of the well bore walls. Numerous means have been employed to alleviate this and among the methods and devices used to prevent collapsing and sloughing of unconsolidated formations are the use of perforated pipe liners, gravel packing or tubular screens or the injection of resin forming materials such as phenol-formaldehyde resins or epoxide resins which function as bonding and consolidating agents for weak formations. Another method employed involves subjecting the incompetent formations to elevated temperatures so as to cause fusion of constituents therein, e.g., silica sand particles, to provide bonding agents. Still another means is to form carbonized or coked material which act as binders to hold the formation as an integral consolidated mass. Essentially these methods and means for consolidating incompetent earth formations have serious limitations as, for example, the mechanical devices mentioned tending to become plugged and generally are incapable of preventing fine particles from entering the production well. Also, these devices require cleaning and constant attention. The use of resin consolidating materials requires special equipment and a treatment process necessitating the presence of a drilling rig and the process is generally time consuming and costly. In essence the same applies to thermal means of consolidating formations as mentioned above or other similar means known to the art. Thus, conventional thermal and chemical means of consolidating loose or incompetent formations are generally inefficient, ineffective, costly and generally cause a decrease in permeability of the formation, and they lack desired resistance to changes in stress, strains, pressure and temperature conditions normally encountered in producing effluent from such formations.

An object of the present invention is to provide an improved method of consolidating loose or incompetent subsurface formations.

Another object of the present invention is to consolidate loose formations with a metallic binding agent which is resistant to hydrolysis and is capable of withstanding great pressures, strains and stresses.

Still another object of the present invention is to bind the grains of loose formations with a catalytic polyvalent metallic binding agent which is resistant to corrosion and is not affected by hot fluids such as water, steam and the like and is also resistant to high thermal temperatures caused by combustion drives and the like.

Still another object of the present invention is to form a catalytic polyvalent metallic consolidated subsurface earth formation having good permeability and good compressive strength, for the recovery of hydrocarbon fluids therefrom particularly when using thermal drives such as hot water or steam in the recovery process.

Still another object of this invention is to metalize formations at a controlled rate and to extended or great depths of penetration of said metal consolidation so as to protect natural materials against dissolution particularly at high temperatures.

Still other objects and advantages will be apparent from the description and examples illustrating the present invention.

SUMMARY OF THE INVENTION

It has now been discovered that incompetent formations which are generally penetrated by wells, can be effectively consolidated by penetrating such formations with an electroless metal-deposition solution capable of plating at a controlled reaction rate and to great depths of penetration on the unconsolidated sand grain particles, a metal coating which protects and binds together the grains of the formation into a permeable consolidated form. The electroless metal-deposition and consolidation of the formation is effectively accomplished by first penetrating an unconsolidated formation with an activator fluid capable of activating or catalyzing the grains of the formation, and thereafter contacting the activated or catalyzed formation with a catalytic metal-deposition solution containing chemicals inclusive of catalytic metal ions and a reducing agent, and effecting a chemical-reducing deposition of metal within the formation and which solution also contains non-catalytic metal salts in amounts sufficient to control or deactivate the metal plating rate of the catalytic metals on the grain surfaces so as to achieve a controlled rate of metal coating or deposition and thereby achieve greater depth of penetration so that larger areas of the formation can be consolidated. The non-catalytic metal salts can be injected independently after the catalytic metal plating solution has been injected into the unconsolidated formation and the injection of the two solutions alternated as desired.

In consolidating oil-bearing loose formations for the recovery of hydrocarbon fluids therefrom by means of wells completed therein, it is preferable that prior to penetrating such formations with an activator and the catalytic metal-deposition and deactivator solutions as mentioned above, that such formations be pretreated with an acidizing fluid and/or preflushing fluid so as to displace oil and connate-water in areas desired to be consolidated by injecting therein suitable acidizing solutions and/or preflushing solvents. During the activating of the components of loose formations, e.g., fine and/or coarse sand particles, by an activating or catalyzing solution and the subsequent consolidation of the formations with a catalytic metal-deposition solution which may contains a deactivator or followed by injection of a deactivation solution, the solutions can be injected into the loose formations with or without spacer fluids between them. It is preferable that the formations be pretreated with a suitable acidizing solution or solvent, prior to penetrating the loose formations with the catalyzing or activator fluid, followed by displacing the activator fluid with an inert fluid such as air or water or by a liquid composition containing a reducing agent and finally metal coating the loose formations with a catalytic metal-deposition solution by electroless means as will be fully described below.

Metals deposited by the process of this invention on loose sand grains in unconsolidated earth formations form excellent binding agents which consolidate the loose sand grains into stable permeable integral formations capable of sustaining great compressive forces and resisting damage to the formations caused by thermal drives. Also, the metal coatings on the grains form impermeable layers that protect the grains from destruction by hot fluids such as hot water and/or steam. The metal coating of siliceous components in earth formation also prevents dissolution of the silica that is contacted by hot aqueous fluids when such fluids are flowed through the earth formations, for example, in recovery of hydrocarbon fluids therefrom.

An unconsolidated mass of sand grains is consolidated by the process of this invention by impregnating the mass first with an activator liquid and then with a catalytic metal-deposition solution containing chemicals inclusive of metal ions and a reducing agent so as to chemically deposit within the mass a metal coating which consolidates the mass. The amount and disposition of the deposited metal are sufficient to bind the sand grains into a consolidated mass capable of sustaining compressive forces of many hundreds of pounds per square inch. Also, the sand grains are coated with an impermeable layer of metal that protects them from being dissolved by hot aqueous fluids. The metal plating solution can contain a small amount of a non-catalytic metal salt to control the reaction rate of the plating or the non-catalytic metal containing solution or deactivator solution can be added after the metal plating solution has been injected into the formation and the metal plating process has been in progress for a desired interval of time.

For the most effective results it is desirable to flow a plurality of pore volumes of both the activator solution, and catalytic metal plating and deactivating solutions through the interval of the formation into which the well is opened and preferably flow pore volumes of each of said solutions through generally shaped zones, e.g., cylindrical or spherical zones having a diameter of from about 1 to about 5 feet around to open portions of a well borehole.

The results of effecting a chemical-reduction deposition of metal within a porous earth formation that surrounds the borehole of a well are such that this is a particularly advantageous process for treating such an earth formation. Where the earth formation is unconsolidated, the metal deposition provides a method of consolidation in which the chemical costs are no more than those of sand consolidation procedures which have proven to be economically advantageous. Where the well is to be employed in the injection or production of hot fluids, the metal deposition provides a treatment that (a) consolidates any unconsolidated portions of the earth formation; (b) metal plates any siliceous components and prevents the dissolution of silica that tends to occur whenever hot aqueous fluids is flowed through a siliceous earth formation that was naturally consolidated or was consolidated by a conventional sand-consolidation procedure; (c) metal plates and improves the stability of any intergranular bonding material that has been formed within the earth formation; and (d) reduces the heat loss that occurs within the tubing string of the production wells that extends into communication with the earth formation by depositing on the tubing strings a reflective metal plating that reduces the thermal emissivity of the tubing string.

In general, a chemical-reduction deposition of metal within a porous mass of earth-formation material in an advantageous procedure for improving the strength and stability of the mass. The electroless metal deposition treatment provides a convenient and relatively economical procedure for binding a sand into a mold in which to solidify a molten material, such as a molten metal, for increasing the thermal or electrical conductivity of a mass of earth-formation material or for dispersing and fixing metals that are to be utilized as catalysts, activators, property indicators, or the like, within such a porous mass, etc.

PREFERRED EMBODIMENTS OF THE INVENTION

The process of metal plating unconsolidated earth formations into consolidated form can be effected by the following sequential steps for consolidating a zone around a borehole by:

(1) Flowing an activator liquid, which contains material capable of being adsorbed on earth-formation-material surfaces and activating them to catalyze deposition of metal from an electroless metal-plating solution, out of the conduit and through at least a portion of the porous earth formation;

(2) Flowing an electroless metal-plating solution out of the conduit and through portions of earth formation that were contacted by the activator liquid and depositing metal capable of catalyzing further electroless metal deposition on activated surfaces of the earth formation;

(3) Flowing a deactivator liquid, which contains material capable of being adsorbed on and deactivating metal that would otherwise catalyze electroless metal deposition, out of the conduit and through portions of the earth formation containing metal deposited by electroless metal deposition; and, (4) Continuing the flow of an electroless metal-plating solution until a plurality of pore volumes flow through portions of earth formations that were deactivated by the deactivator liquid and flow into and deposit metal within portions of earth formation that contain surfaces which are catalytic in respect to electroless metal plating.

In permeating a porous mass by the process of the present invention with an activator or catalytic liquid, each element of the mass is preferably contacted with at least several pore volumes of the liquid. Palladium-activator solutions or stannous-activator solutions should also contain reducing agents such as hydrazine or sodium hypophosphate or lower aldehyde, e.g., formaldehyde. Such activator solutions can be palladium chloride and/or stannous chloride solutions or corresponding bromide, nitrate or sulfate solutions. The activator solutions are preferably acidic aqueous solutions such as palladium chloride-hydrazine solutions acidified with acetic or formic acid. Other such activator fluids can be aqueous solutions containing gold, ruthenium, rhodium, platinum or any of the so-called metallic dehydrogenation catalysts and a reducing agent such as hydrazine with or without the presence of protective colloids, e.g., soluble gums such as gum arabic tragacanth; proteins, e.g., gelatin, albumin, starch, glucosides or the like. The porous mass can be first treated with an acid solution such as sulfuric or hydrochloric acid solutions alone or in conjunction with the activator solutions. The pH of the activator solution should be in the range of 3–5 and can be controlled by the presence of lower acids such as formic or acetic acids, acetic anhydride and salts thereof and mixtures thereof.

The formation can be pretreated with a mud acid (410 cc. concentrated HCl+590 cc. $H_2O$+32 grams $NH_4F$+2 cc. amine corrosion inhibitor) or any suitable acidizing fluids such as described in U.S. Patents 3,215,199; 3,236,305; 3,249,536 and 3,231,415.

The activator liquid may be displaced prior to injecting the catalytic metal plating solution by an inert fluid, for example, by air where the liquid is drained from a mold, or by a liquid containing a reducing agent. In treating a subsurface earth formation it is preferable to precede the above steps by a conventional oil- and connate-water displacing procedure such as described in U.S. Patent 3,294,166 for sand consolidation with epoxy resin. Since this procedure generally displaces oil and connate-water films from the tubing string, such a pretreatment ensures that some metal deposition will occur in the injection tubing string when the metal deposition solution is injected into the treated porous mass through said tubing string in the well bore in communication with the porous mass, and therefore some thermal-emissivity reduction can be provided in respect to the thermal properties of the tubing string.

The metal plating solution can be in the basic pH range of 8–14, preferably 8–10, or acidic pH range of 2.5–5. The basic pH regulators can be aqueous ammonical solutions containing ammonium hydroxide, ammonium chloride and mixtures thereof and the acidic pH regulator can be formic or acetic acid, acetic anhydride or salts thereof. Control of pH aids in forming more uniform metal deposition through the formation and to greater depths. The reaction rate of metal deposition on the surfaces to be consolidated is most effective when the pH of the solution is about 8 or 9 and the temperature is in the range of from about 35° F. to about 125° F. and at a pH of 2.5–5 when the temperature of the formation is above 125°, preferably between about 150 and about 200° F.

The metal-plating compound can be a catalytic polyvalent metal compound of which preferred compounds include nickel and cobalt compounds and mixtures thereof, e.g., nickel and/or cobalt chloride and/or sulfate. These metal compounds are reduced by such reagents as hypophosphorus acid, hypophosphites, e.g., sodium hypophosphite or alkaline solution of molybdenate, formate and/or hydroxy carboxylates, e.g., hydroxy-acetate. The concentration of the metal-containing compounds and the reducing agents in aqueous solutions can be varied over a wide range such as from 1 to 50% respectively, and preferably from 5 to 40% each.

The non-catalytic metal or deactivator solution can be substantially any liquid containing material capable of being adsorbed on and deactivating metal that would otherwise catalyze electroless metal plating. Suitable liquids include electroless metal-plating solutions containing also salts of non-catalytic metals such as copper, lead, cadmium, iron, etc., or independent aqueous solutions containing one or more non-catalytic metals such as copper, lead, cadmium, tin, molybdenum; aqueous or oil-phase liquids containing materials that are adsorbed on and inhibit contact with catalytically active metal surfaces, e.g., strongly adsorbed materials such as partially hydrolyzed acrylamide polymers, gum arabic, gelatin, etc.; anionic or cationic surfactant materials such as polyamines, long-chain alkyl-aryl sulfonates, fatty-acid soaps, etc. Non-metallic additives having deactivating properties can also be used.

The effective concentration of the deactivating agent is important. This agent should be adsorbed within the initially contacted portions of the porous earth formation so that those portions are selectively deactivated while the more remote portions are left active. Where the deactivator is dissolved in the electroless metal-plating solution, its concentration is preferably in the range of from trace amounts to about 10 percent by weight. Where the deactivator is contained in a liquid separate from the metal-plating solution, slugs of the deactivator liquid are alternated with slugs of the plating solution, and the volumes and/or concentrations of the deactivator liquid slugs are adjusted so that substantially all of the deactivating agent is selectively adsorbed on the first contacted portions of the earth formation.

The method of the present invention for regulating the reaction rate of metal-plating greatly assists in the practical use of the consolidation process in field operations. It makes use of one or more non-catalytic metals such as Pb or Cu which are added to the plating bath. These metals partially or completely deactivate the catalytic metal as is is deposited. This results in greatly decelerating the growth of the deposited metal and may even prevent its growth beyond a predetermined thickness. In this way good consolidation can be assured without danger of excessive damage to the formation permeability.

As little as 10 g./l. of $CuCl_2$ added to either the alkaline or acidic metal plating bath will increase the depth of consolidation in a linear flow system by a factor of 3 over the value obtained with the $CuCl_2$ salt.

To keep the hydrogen evolution to a minimum during the reaction, the reducing agents in the metal-plating solutions should be kept at a minimum generally not in excess of 10% of the total electroless metal plating solution. Also, hydrogen evolution can be effectively suppressed and the life of the metal-plating reaction increased by addition to such aqueous solutions buffering and chelating agents such as hydroxy carboxylic acids and polycarboxylic acids and their salts, e.g., citric, tartaric, maleic, gluconic, succinic acids or ammonium or alkali metal salts of said acids such as sodium citrate, sodium succinate and the like. However, the gas can be effectively eliminated from the area being metalized by applying pressure of 200 pounds or more on the system.

To promote wetting of the surfaces to be metalized by the electroless process of the present invention, wetting agents can be used such as reaction products of alkylphenol and alkylene oxide, e.g., nonyl phenolethylene oxide reaction product wherein the number of ethylene oxide units in the molecule ranges from 4 to 20; sulfated alcohols, sulfonate of fatty acids having from 12 to 18 carbon atoms, e.g., sulfonated oleic acid, sulfonated mineral oil fractions and the like.

Also, when using hypophosphites as the reducing agent their concentration should be controlled since depending in part on the phosphorus content of the solution the metal being plated can be in the form of an alloy of metal-phosphorus nickel phosphide. High concentrations such as above 10% of hypophosphite in the metal plating solution tend to form these alloys.

The catalytic metal-plating consolidation process of the present invention can be also used to improve earth formations which have been previously consolidated by various resins or plastics such as epoxy resins or various other types by forming on the resin coated surface a metal coating that renders the consolidated formation resistant to hydrolysis at elevated temperatures, such as those encountered when hot water and/or steam is injected into such systems for secondary recovery of hydrocarbon fluid such as petroleum oil. The metalization of resin or plastic consolidated formations is effectively accomplished by the process of the present invention. This is particularly desirable in cases where resins used to consolidate formations are thermally stable but are hydrolytically unstable and tend to disintegrate on prolonged exposure to steam or hot water. The same applies to formations consolidated with quartz or other types of consolidators.

To illustrate the use of metal plating in sand consolidation the following illustrative examples are set forth.

EXAMPLE I

Procedure (1) The oil-free dry sand was packed in a small pipe nipple and connected to a pump. Temperature was controlled by a water bath and a back pressure valve maintained a pressure on the system of 600 p.s.i. All air was removed from the system by flowing alcohol and water through the sand pack.

(2) The sand was activated by flowing about 10 pore volumes of the following activating solution through the sand pack:

a) 919 cc. water
b) 81 cc. gum arabic solution containing 0.4 gram/l. gum arabic
c) 0.4 cc. hydrazine hydrate (85% solution)
d) 1.0 cc. of a solution containing:
   1.6 grams $PdCl_2$
   10 cc. conc. HCl
   90 cc. water
e) Sufficient glacial acetic acid to give H=4.2 (usually 1 to 3 cc.). The amount of activator required depends on the surface area of the sand and must be empirically determined for each different type of sand to be consolidated.

(3) To separate the plating solution from the activating solution above a spacer is used. This may be 1 or 2 pore volumes of water or a dilute (by a factor of 10) solution of the activator solution above.

(4) Consolidation is achieved by flowing approximately 150 pore volumes of the following nickel plating solution through the activated sand:

a) 81.6 cc. $H_2O$
b) 3.62 grams $NiCl_2 \cdot 6H_2O$
c) 4.33 grams $NaH_2PO_2 \cdot H_2O$
d) 5.95 grams $NH_4Cl$
e) 4.75 grams (5.0 cc.) 29.4% w. $NH_3$ solution (conc. ammonium hydroxide)
g) To this solution was added 0.36 grams of $FeSO_4$ solution to control metal plating rate.

Results

The sand was well consolidated having about 6000 p.s.i. compressive strength at the inlet.

EXAMPLE II

Procedure (1) Same as (1) above under procedure.
(2) Same as (2) above under procedure but all solutes were four times more concentrated except glacial acidic acid which is added to give H=4.2 as before.
(3) Same as (3) above under procedure but dilution was by a factor of 40 if water was not used.
(4) Nickel plating was initiated by flowing 4 to 5 pore volumes of the following solution:

a) 835 cc./l. $H_2O$
b) 38 grams/l. $NiCl_2 \cdot 6H_2O$
c) 45.6 grams/l. $NaH_2O_2 \cdot O$
d) 62.5 grams/l. $NH_4Cl$
e) 52.2 cc./l. 29.4% w. $NH_3$ (conc. ammonium hydroxide solution)
f) 80 grams/l. sodium citrate $\cdot 2H_2O$
g) An aqueous solution of 3.8 grams/l. of $FeSO_4$ was added to control metal plating rate.

(5) Consolidation was achieved by flowing about 170 pore volumes of the following solution through the actuated and untreated sand:

a) 856 cc./l. $H_2O$
b) 38 grams/l. $CoCl_2 \cdot 6H_2O$
c) 33 grams/l. $NaH_2PO_2 \cdot H_2O$
d) 62.5 grams/l. $NH_4Cl$
e) 52.2 cc./l. 29.4% w. $NH_3$ (conc. ammonium hydroxide solution).

(6) Final flush was injected using about 5 pore volumes of the following solution:

a) 905 cc./l. $H_2O$
b) 66 grams/l. $NH_4Cl$
c) 55 cc./l. 29.4% w. $NH_3$ (conc. ammonium hydroxide solution).

Results

The sand was consolidated in the same manner as described in Example I above.

EXAMPLE III

Procedure (1) The oil-free dry sand was packed in a small pipe nipple and connected to a pump. Temperature was controlled by a water bath and a back pressure valve maintained a pressure on the system of 600 p.s.i. All air was removed from the system by flowing alcohol and water through the sand pack.

(2) The sand was activated by flowing about 10 pore volumes of the following activating solution through the sand pack:

(a) 919 cc. water
(b) 81 cc. gum arabic solution containing 0.4 gram/l. gum arabic
(c) 0.4 cc. hydrazine hydrate (85% solution)
(d) 1.0 cc. of a solution containing:
   1.6 grams $PdCl_2$
   10 cc. conc. HCl
   90 cc. water
(e) Sufficient glacial acetic acid to give H=4.2 (usually 1 to 3 cc.). The amount of activator required depends on the surface area of the sand and must be empirically determined for each different type of sand to be consolidated.

(3) To separate the plating solution from the activating solution above a spacer is used. This may be 1 or 2 pore volumes of water or a dilute (by a factor of 10) solution of the activator solution above.

(4) Consolidation is achieved by flowing approximately 150 pore volumes of the following nickel plating solution through the activated sand:

(a) 81.6 cc. $H_2O$
(b) 3.62 grams $NiCl_2 \cdot 6H_2O$
(c) 4.33 grams $NaH_2PO_2 \cdot H_2O$
(d) 5.95 grams $NH_4Cl$
(e) 4.75 grams (5.0 cc.) 29.4% w. $NH_3$ solution (conc. ammonium hydroxide)
(f) To this solution was added 0.36 gram of $CuCl_2$ solution to control metal plating rate.

Results

The sand was well consolidated having about 6000 p.s.i. compressive strength at the inlet.

EXAMPLE IV

Procedure (1) Same as (1) above under procedure.
(2) Same as (2) above under procedure but all solutes were four times more concentrated except glacial acidic acid which is added to give H=4.2 as before.
(3) Same as (3) above under procedure but dilution was by a factor of 40 if water was not used.
(4) Nickel plating was initiated by flowing 4 to 5 pore volumes of the following solution:

(a) 835 cc./l. $H_2O$
(b) 38 grams/l. $NiCl_2 \cdot 6H_2O$
(c) 45.6 grams/l. $NaH_2PO_2 \cdot H_2O$
(d) 62.5 grams/l. $NH_4Cl$
(e) 52.2 cc./l. 29.4% w. $NH_3$ (conc. ammonium hydroxide solution)
(g) An aqueous solution of 3.8 grams/l. of $CuCl_2$ was added to control metal plating rate.

(5) Consolidation was achieved by flowing about 170 pore volumes of the following solution through the actuated and untreated sand:

(a) 856 cc./l. $H_2O$
(b) 38 grams/l. $CoCl_2 \cdot 6H_2O$
(c) 35 grams/l. $NaH_2PO_2 \cdot H_2O$
(d) 62.5 grams/l. $NH_4Cl$
(e) 52.2 cc./l. 29.4% w. $NH_3$ (conc. ammonium hydroxide solution).

(6) Final flush was injected using about 5 pore volumes of the following solution:

(a) 905 cc./l. $H_2O$
(b) 66 grams/l. $NH_4Cl$
(c) 55 cc./l. 29.4% w. $NH_3$ (conc. ammonium hydroxide solution).

Results

The sand was consolidated in the same manner as described in Example III above.

EXAMPLE V

Procedure (1) Same as (1) above under procedure.
(2) Same as (2) above under procedure but all solutes were four times more concentrated except glacial acidic acid which is added to give H=4.2 as before.
(3) Same as (3) above under procedure but dilution was by a factor of 40 if water was not used.
(4) Nickel plating was initiated by flowing 4 to 5 pore volumes of the following solution:

(a) 835 cc./l. $H_2O$
(b) 38 grams/l. $NiCl_2 \cdot 6H_2O$
(c) 45.6 grams/l. $NaH_2PO_2 \cdot H_2O$
(d) 62.5 grams/l. $NH_4Cl$
(e) 52.2 cc./l. 29.4% w. $NH_3$ (conc. ammonium hydroxide solution)
(f) 80 grams/l. sodium citrate $\cdot 2H_2O$
(g) An aqueous solution of 3.8 grams/l. $CdCl_2$ was added to control metal plating rate.

(5) Consolidation was achieved by flowing about 170 pore volumes of the following solution through the actuated and untreated sand:

(a) 856 cc./l. $H_2O$
(b) 38 grams/l. $CoCl_2 \cdot 6H_2O$
(c) 33 grams/l. $NaH_2PO_2 \cdot H_2O$
(d) 62.5 grams/l. $NH_4Cl$
(e) 52.2 cc./l. 29.4% w. $NH_3$ (conc. ammonium hydroxide solution).

(6) Final flush was injected using about 5 pore volumes of the following solution:

(a) 905 cc./l. $H_2O$
(b) 66 grams/l. $NH_4Cl$
(c) 55 cc./l. 29.4% w. $NH_3$ (conc. ammonium hydroxide solution).

Results

The sand was consolidated in the same manner as described in Example I above.

EXAMPLE VI

Conditions (1) Formation temperature, 160° F.
(2) Absolute pressure, 5000 p.s.i.
(3) Injection rate during plating, ¼ bbl./min. per perforated well bore foot (1.3 pore volumes per minute).
(4) Time of plating, 60 minutes.
(5) $N_4$ sands S/L 998 H/30 16 perforations—4 per foot.

Procedure (1) Remove all debris and other fine material from the perforations by injecting about 500 gallons of mud acid (12% HCl, 3% $NH_4F$, .01% Inhibitor A–109) at rate of 1 barrel per minute (spot heavy brine solution below perforation to avoid loss of solutions down rat hole).

(2) Remove crude oil and water by flushing formation with about 8 barrels of diesel oil and about 8 barrels of anhydrous isopropyl alcohol.

(3) Activate with about 15 barrels of the following solution:

(a) 15 barrels filtered drinking water (Venine, Louisana)
(b) 0.634 pound gum arabic
(c) 3.836 liters hydrazine hydrate (85%)
(d) A solution composed of:
    153 grams $PdCl_2$
    938 cc. 38% HCl (reagent grade)
    9 liters water
(e) 12 liters glacial acidic acid or sufficient to adjust pH to 4.2
(f) 53 pounds $NiSO_4 \cdot 6H_2O$.

(4) Use as spacer about 2 barrels of following solution:

(a) 2 barrels filtered drinking water
(b) 12 gallons activator solution 3 above as desired
(c) Adjust pH to 4.2 with glacial acetic acid
(d) 7 pounds $NiSO_4 \cdot 6H_2O$ (5) Consolidate with about 60 barrels of the following:

(a) 1613 gallons filtered drinking water
(b) 1770 pounds $NiSO_4 \cdot 6H_2O$
(c) 2520 pounds $NaH_2PO_2 \cdot H_2O$
(d) 1890 pounds Na acetate $\cdot 3H_2O$
(e) 630 pounds Na succinate $\cdot 6H_2O$
(f) 504 gallons glacial acetic acid
(g) A solution of 177 pounds $FeSO_4$ was added thereafter.

(6) Displace spent plating solution in formation with 5 barrels of 5% NaCl solution.

Results

Well produced sand free for about 4 months and well productivity after consolidation was much higher than the field average.

EXAMPLE VII

Conditions (1) Formation temperature, 170° F.
(2) Absoute pressure, 5000 p.s.i.
(3) Injection rate during plating, 0.32 pore volumes per minute.
(4) Time of plating, 235 minutes.
(5) Clemtex No. 5 blasting sand (laboratory tests).

Procedure (1) Same as Example VI, step (1).
(2) Same as Example VI, step (2).
(3) Same as Example VI, step (3).
(4) Consolidation is achieved by flowing approximately 75 pore volumes of the following solution through the activated sand:

(a) 84 grams/l. $NiSO_4 \cdot 6H_2O$
(b) 120 grams/l. $NaH_2PO_2 \cdot H_2O$
(c) 30 grams/l. Na succinate $\cdot 6H_2O$
(d) 45 grams/l. Na formate
(e) 53 cc./l. 90% formic acid
(f) 827 cc./l. water
(g) A solution of 8.4 grams/l. of $FeSO_4$ was added thereafter.

Results

Well produced sand free for about 4 months and well productivity after consolidation was much higher than the field average.

Other useful electroless basic metal plating solutions are shown in Table 1.

TABLE 1.—PLATING SOLUTIONS

| | VIII | IX | X | XI |
|---|---|---|---|---|
| H₂O, cc./l. (gal./bbl.) | 721 (30.3) | 858 (36.0) | 878 (36.9) | 680 (28.6) |
| NiCl₂·6H₂O, grams/l. (lb./bbl.) | 76.5 (36.8) | 37.9 (13.3) | | |
| NiSO₄·6H₂O, grams/l. (lb./bbl.) | | | 42 (14.7) | 42 (14.7) |
| NaH₂PO₂·H₂O, grams/l. (lb./bbl.) | 92 (32.2) | 45.5 (15.9) | 68 (23.8) | |
| NH₄Cl, grams/l. (lb./bbl.) | 126.5 (44.3) | 62.5 (21.9) | | |
| Conc. NH₄OH (29.4% NH₃), cc./l. (gal./bbl.) | 105 (4.41) | 52.1 (2.19) | | |
| Na acetate, grams/cc | | | | 60 (21.0) |
| Na acetate·3H₂O, grams/l (lb./bbl.) | | | 60 (21.0) | |
| Glacial acetic acid, cc./l. (gal./bbl.) | | | 37.5 (1.58) | 240 (10.1) |
| CuCl₂, grams/l | 7.6 | | 4.2 | |
| FeSO₄, grams/l | | 3.8 | | 4.2 |
| pH | 8.5 | 8.5 | 4.35 | 3.52 |

Conversion factors: 1 gram/l.=0.35052 lb./bbl., 1 cc./l.=0.042 gal./bbl.

Notable features of the present invention are the control of the reaction rate of the electroless metal process so that greater depths of consolidation are achieved and also the metal plating process aids in reducing corrosion and heat loss of tubing strings used in the bore wells for when injecting the binding and activating fluids into the underground production areas the tubing strings are metalized by the process of the present invention. As these fluids are injected into the loose formations the tubing strings are also metalized with such materials as nickel or cobalt or nickel phosphide or cobalt phosphide or nickel-iron protective metal coatings, as well as other parts of the equipment and apparatus with which said metalizing fluids come in contact.

The foregoing description of the invention is merely intended to be explanatory thereof. Various changes in the details of the described method may be made, within the scope of the appended claims, without departing from the spirit of the invention.

I claim as my invention:

1. A method of consolidating at a controlled reaction rate an incompetent earth formation penetrated by a well comprising the steps of:
   (a) injecting through the well and into the formation to be consolidated an aqueous solution containing an activating agent capable of activating the surface of the incompetent formation;
   (b) injecting through the well and into said formation an aqueous solution containing a catalytic metal-plating compound and a reducing agent;
   (c) injecting said metal-plating containing solution in an amount sufficient to displace said activating agent solution and flow a plurality of pore volumes of the catalytic metal-plating compound solution through the interval of said formation;
   (d) injecting thereafter through the well and into the incompetent formation to be consolidated a solution containing a non-catalytic compound to achieve consolidation of the formation; and
   (e) reinjecting the solution in step (c) to effect final formation consolidation by metal plating.

2. A method of claim 1 wherein the activating agent is a compound selected from the group consisting of palladium, platinum, gold, ruthenium, rhodium and stannous chloride, bromide, nitrate and sulfate and mixtures thereof; the catalytic metal-plating compound is selected from the group consisting of nickel and cobalt compounds and mixtures thereof; the reducing agent is selected from the group consisting of hypophosphorus acid, alkali metal hypophosphite, alkali metal molybdenate, a lower aldehyde and mixtures thereof; the non-catalytic compounds being selected from the group consisting of copper, lead, iron and cadmium compounds; and the metal-plating solution is made basic by the presence of an ammonium compound.

3. The method of claim 1 wherein the metal-plating solution is made acidic by addition thereto of formic acid or acetic acid.

4. The method of claim 1 wherein the metal plating is accomplished within an incompetent formation having a temperature between 35° F. and 200° F.

5. The method of claim 1 wherein prior to injecting the activating metal-plating and deactivating solutions, a solvent or acidizing solution or mixtures thereof are injected into the incompetent formation to sweep oil and connate water therefrom.

6. The method of claim 1 wherein the pH of the activating solution (a) is betwen 3 and 5.

7. The method of claim 1 wherein steps (c) and (d) are combined and injected simultaneously.

8. A method of consolidating an incompent earth formation penetrated by a borehole of a wall comprising:
   (a) injecting through a tubing string of said well and into the incompetent formation an aqueous solution containing a small amount of palladium chloride activating agent and a reducing agent;
   (b) injecting through a tubing string of the well an ammonical aqueous solution of nickel chloride and sodium hypophosphite at a temperature of between 35° F. and 125° F.
   (c) injecting enough of said nickel plating compound solution to displace said activating agent solution and flow a plurality of pore volumes of the nickel-plating compound solution through the interval of said formation into which the well is opened to achieve consolidation;
   (d) injecting a deactivator solution containing a non-catalytic metal compound selected from the group consisting of copper, lead, cadmium, iron, tin and molybdenum salt and mixtures thereof; and,
   (e) achieving consolidation of the formation.

9. The method of claim 8 wherein the nickel chloride solution is made basic by addition of ammonium chloride.

10. The method of claim 9 wherein the solutions (a) and (b) are separated by a spacer fluid.

11. The method of claim 8 wherein prior to injecting solutions (a) and (b) into the incompetent formation, an acidizing fluid and solvent are injected into the formation.

12. The method of claim 8 wherein the pH of the activating solution (a) is between 3 and 5.

13. The method of claim 8 wherein steps (c) and (d) are combined and injected simultaneously.

14. A method of consolidating an incompetent earth formation penetrated by a borehole of a well comprising:
   (a) injecting through a tubing string of said well and into the incompetent formation an aqueous solution containing a small amount of palladium chloride activating agent and a reducing agent;
   (b) injecting through a tubing string of the well an acidic aqueous solution of nickel chloride and sodium hypophosphite at a temperature of between 125° F. and 200° F.
   (c) injecting enough of said nickel plating compound solution to displace said activating agent solution and flow a plurality of pore volumes of the nickel-plating compound solution through the interval of said formation into which the well is opened to achieve consolidation;
   (d) injecting a deactivator solution containing a non-catalytic metal compound selected from the group consisting of copper, lead, cadmium, iron, tin and molybdenum salt and mixtures thereof; and,
   (e) achieving consolidation of the formation.

15. The method of claim 14 wherein the nickel solution is a nickel sulfate solution made acidic by the presence of a lower acid selected from the group consisting of acetic acid and formic acid.

16. The method of claim 14 wherein prior to injecting solutions (a) and (b) into the incompetent formation, an acidizing fluid and solvent are injected into the formation.

17. The method of claim 14 wherein the pH of the activating solution (a) is between 3 and 5.

18. The method of claim 14 wherein steps (c) and (d) are combined and injected simultaneously.

References Cited

UNITED STATES PATENTS

| | | | |
|---|---|---|---|
| 3,062,666 | 11/1962 | McLeod | 106—1 |
| 3,148,072 | 9/1964 | West et al. | 106—1 |
| 3,250,330 | 5/1966 | Smith | 166—38 X |
| 3,370,974 | 2/1968 | Hepfer. | |
| 3,378,400 | 4/1968 | Sickles | 106—1 |
| 3,382,079 | 5/1968 | Olsen et al. | 106—1 |
| 3,393,737 | 7/1968 | Richardson | 166—29 |

CHARLES E. O'CONNELL, Primary Examiner

I. A. CALVERT, Assistant Examiner

U.S. Cl. X.R.

166—300; 117—54